United States Patent [19]

Ono et al.

[11] 4,199,721
[45] Apr. 22, 1980

[54] HAND-HELD MICROPHONE FOR TRANSCEIVER

[75] Inventors: Atsushi Ono, Fussa; Shoji Fujino, Tokyo; Yukio Ozaki, Tateno; Kentaro Suzuki, Ageo, all of Japan

[73] Assignee: Nippon Atsudenki Kabushiki Kaisha, Tokyo, Japan

[21] Appl. No.: 843,668

[22] Filed: Oct. 19, 1977

[51] Int. Cl.² ............................................. H04B 1/40
[52] U.S. Cl. ..................................... 455/77; 179/179
[58] Field of Search ........................... 325/15, 16, 25; 179/179

[56] References Cited

U.S. PATENT DOCUMENTS

| 4,032,844 | 6/1977 | Imazeki | 325/15 |
| 4,132,950 | 1/1979 | Cochran et al. | 325/25 |

OTHER PUBLICATIONS

SBE Touch/Com, Popular Electronics Jun., 76.
Hy-Gain Advertisement, Motor Trend Dec. 1976.

Primary Examiner—Robert L. Griffin
Assistant Examiner—Michael A. Masinick
Attorney, Agent, or Firm—Quaintance, Murphy & Richardson

[57] ABSTRACT

Hand-held microphone consisting of a housing which is of such a size that said housing can be easily held by one hand, said housing including a rotary switch means which generates a digital coded signal for individually selecting one of preset frequencies and a digital coded signal for making a digital display of the channel member corresponding to the selected frequency; a channel number display means which is driven by the digital coded signal from said rotary switch means and makes a digital display of the channel number corresponding to the selected frequency; an electroacoustic transducer means; a transmit/receive switch means which switches between transmitting condition and receiving condition of a transceiver and at the same time actuates said electroacoustic transducer means; and a gain control means which varies the amplification degree of the audio amplifier and/or the radio frequency amplifier in the transceiver, whereby transmission or reception can be made by the operator who handles the transceiver in one hand.

13 Claims, 15 Drawing Figures

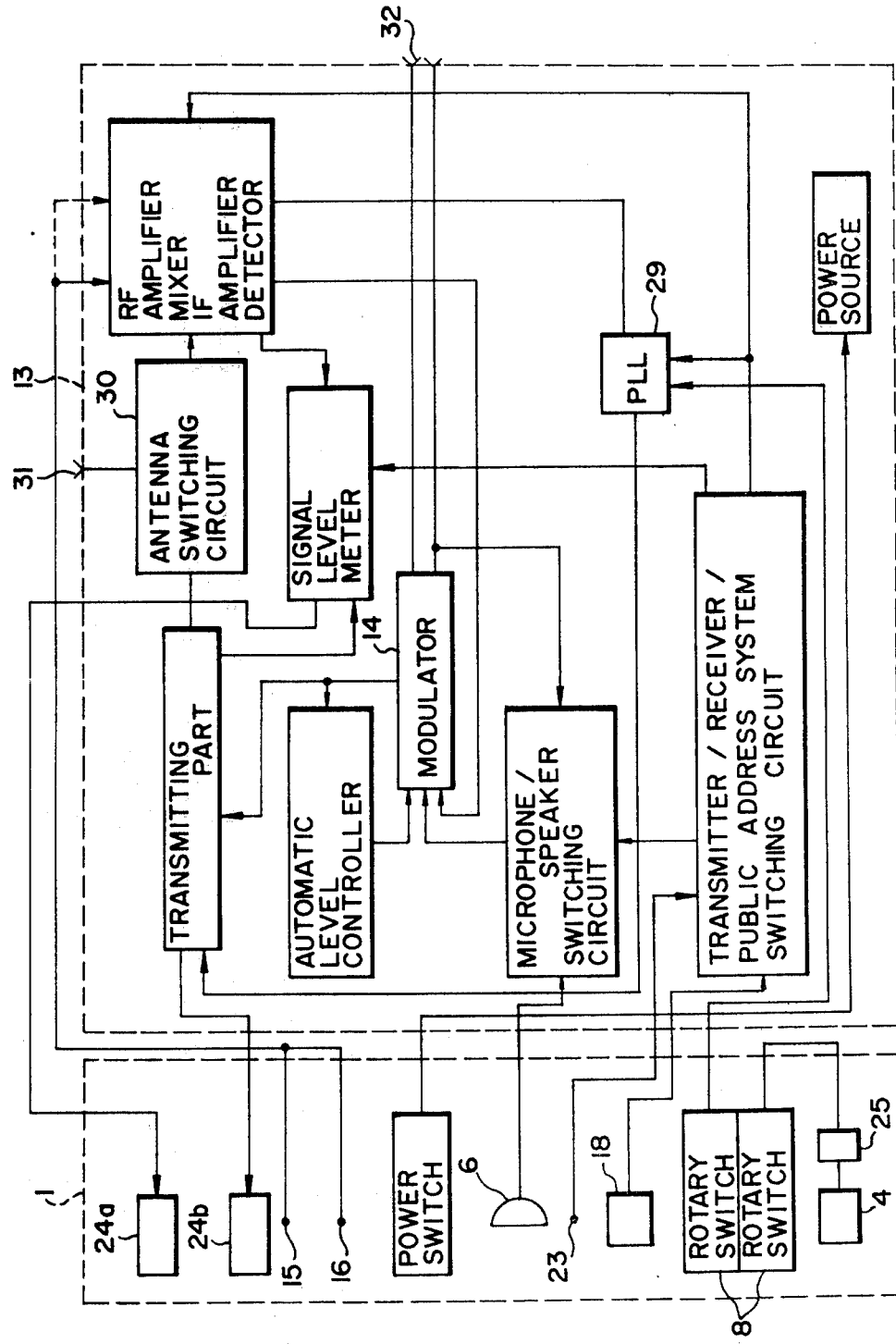

HAND-HELD MICROPHONE FOR TRANSCEIVER

BACKGROUND OF THE INVENTION

The present invention relates to a hand-held microphone for the transceiver characterized in that the operating portions which are to be handled by the operator of a transceiver are built into a housing of such a size that said housing can be easily gripped by one hand and the operator can operate the transceiver in his hand.

A citizen band transceiver which can serve not only as a fixed station but also as a mobile station to be mounted on a passenger car or a truck is found very convenient and has been popularly used in various countries.

In the U.S.A. where the frequency bands assigned to the citizen band amount to as many as 40 channels, the transceiver has to be equipped with a 40-channel switch means. In the conventional practice the channels are switched with the aid of a large number of crystal resonators installed. If the crystal resonator switch means is to be separated from the transceiver and it is to be operated from the microphone side, the conductors in the cord connecting the microphone, separated from the transceiver, with the transceiver have to be increased, which is controversial from a standpoint of reliability.

The present invention, which aims at elimination of the above difficulty, features an improvement of the microphone function by adopting digital coded signals for the purpose of selecting one of preset frequencies and displaying the channel number corresponding to the selected frequency.

SUMMARY OF THE INVENTION

The first object of the present invention is to provide a hand-held microphone for the transceiver in which the operating portions separated from the transceiver are built into a housing which is so small that it can be gripped by one hand and thus the operator can operate the transceiver in his hand.

The second object of the present invention is to improve the microphone function by adopting digital coded signals for selecting one of preset frequencies and displaying the channel number corresponding to the selected frequency.

The third object of the present invention is to provide a hand-held microphone for the transceiver in which a housing small enough to be gripped by one hand holds a rotary switch means which generates a digital coded signal for individually selecting one of preset frequencies and a digital coded signal for making a digital display of the channel number corresponding to the selected frequency; a channel number display means which is driven by a digital coded signal from said rotary switch means and makes a digital display of the channel number corresponding to the selected frequency; an electroacoustic transducer means; a transmit/receive switch means which switches between transmitting condition and receiving condition and at the same time actuates said electroacoustic transducer means; and a gain control means which varies the amplification degree of the audio amplifier and/or the radio frequency amplifier in the transceiver, whereby the operator can make transmission or reception by operating the transceiver in his hand.

Several other objects and embodiments of the present invention will become apparent from a detailed description and attached drawings which follow.

BRIEF DESCRIPTION OF THE DRAWINGS

FIG. 11 is a block diagram of the electric circuit in the transceiver.

Figure 1:
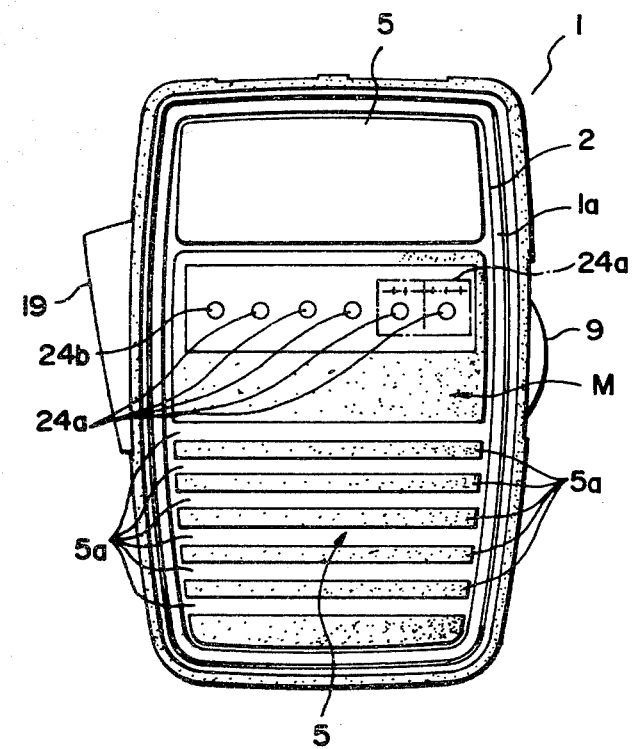
FIG. 1 is an elevation view of a hand-held microphone as one embodiment of the present invention.

An embodiment of the present invention is to be described referring to the drawings.

DESCRIPTION OF PREFERRED EMBODIMENTS

In FIGS. 1-4, the housing 1 is of such a size that it is easy to grip by one hand. Said housing consists of the front casing 1a and the rear casing 1b, the whole surface of it being matt-finished (M) to prevent the reflection of light. At the edges of the front casing 1a and the rear casing 1b there are provided flat-top ridges 1a', 1b', said ridges serving to bridge the front and rear casings to constitute the housing 1.

The face of the front casing 1a is provided an opening 2, which frames the channel display device 4 composed of light emission diode (LED) attached to the printed circuit board 3. Said opening 2 is equipped with an optical filter 5 which makes it easy to recognize the display on the display device 4.

Figure 5A:
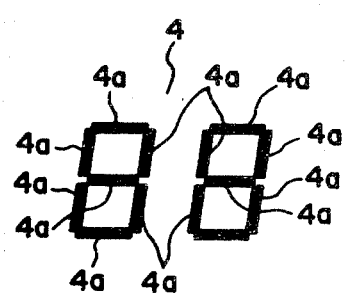
FIGS. 5 (A) (B) (C) show the elements of the channel number display device.
Figure 5B:
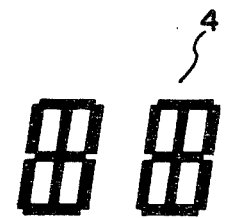
Figure 5C:
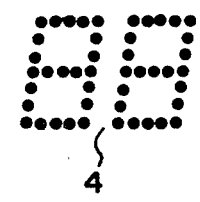
Figure 2:
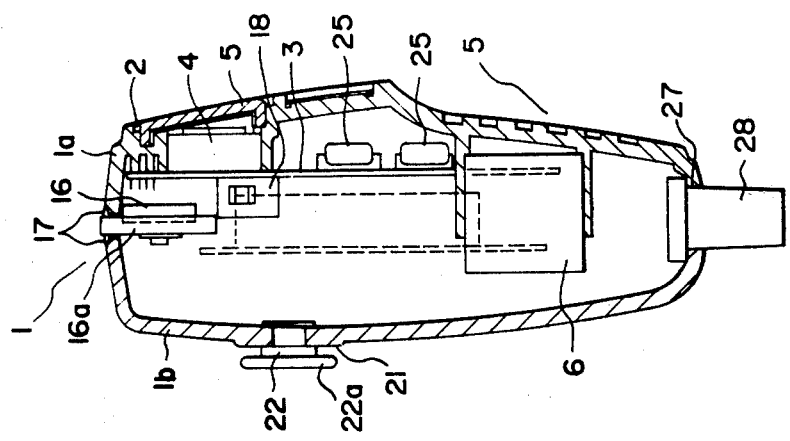
FIG. 2 is a right side section view of the microphone in FIG. 1.
Figure 3:
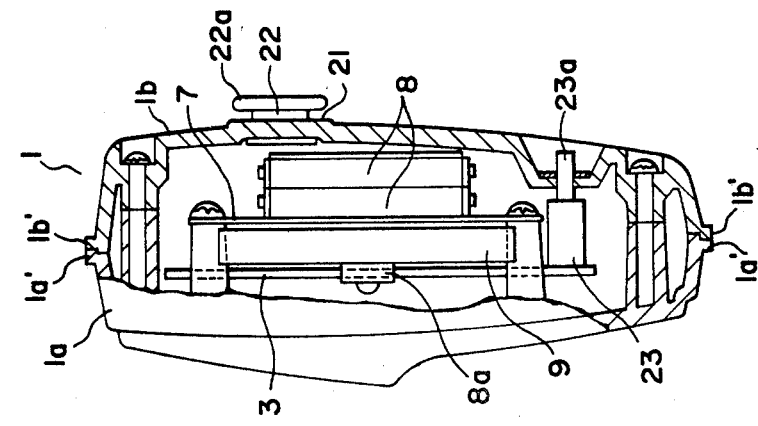
FIG. 3 is a left side section view of the microphone in FIG. 1.
Figure 4:
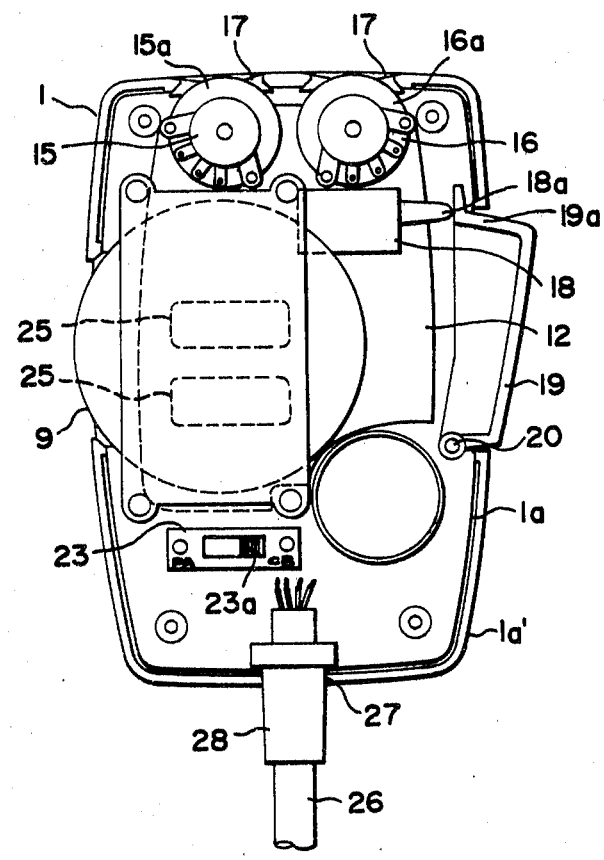
FIG. 4 shows the head-held microphone with the rear casing removed.

As indicated in FIG. 5 (a), the display device 4 is a 7-segment system, in which each segment 4a is selected to make a digital display of the channel to be used. In this case a 7-segment system is used but a 9-segment one illustrated in FIG. 5 (b) or a 5-7 matrix one illustrated in FIG. 5 (c) may be adopted to make a digital display in said display device 4. Further instead of LED, liquid crystal or fluorescent-display tube as the display device 4 may be employed.

Figure 6:
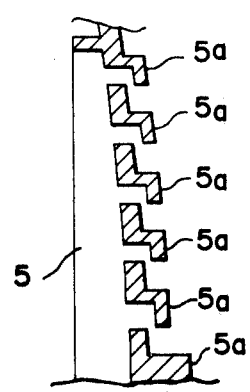
FIGS. 6 and 7 are section views of the blind structure.
Figure 7:
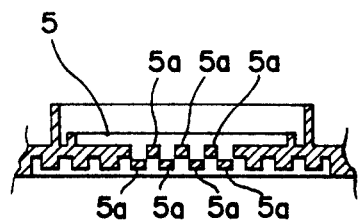

As shown in FIGS. 1 and 6, before the front casing 1a is provided a blind structure 5 of bars 5a of crank form in section vertically arranged at specific spacing, said structure preventing dust or spittle in speaking from invading the housing 1. Within the front casing 1a there is installed an electroacoustic transducer 6 which can function both as a speaker and as a microphone and said transducer 6 faces the blind structure 5 of the front casing 1a. In the blind structure as illustrated in FIG. 7 where the bars 5a extend each in the vertical direction, said bars 5a of rectangular form in section may be arranged in the width direction in staggered pattern.

Figure 8:
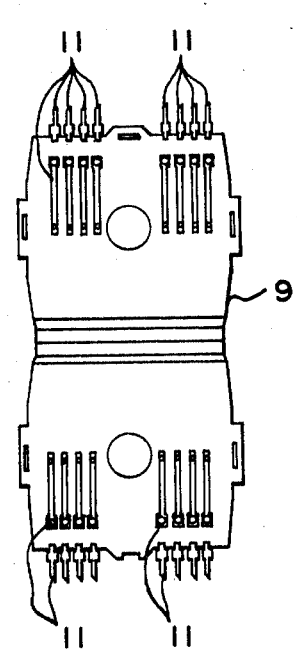
FIG. 8 shows the frame body of the rotary switch.
Figure 9:
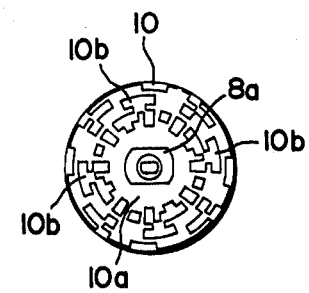
FIGS. 9 and 10 show the wafers of the rotary switch.
Figure 10:
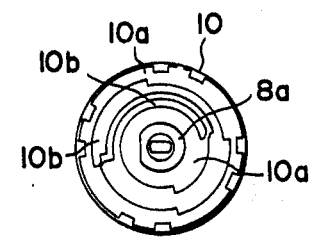

On the mounting plate 7 within the front casing 1a is mounted the rotary switch 8 and a disk knob 9 fixed to the stem 8a of said rotary switch 8 juts out of the junction between said two casings 1a, 1b. Details of the rotary switches 8,8, one of which generates a digital coded signal for individually selecting one of preset frequencies, the other of which generates a digital coded signal for making a digital display of channel number corresponding to the selected frequency, referring to FIGS. 8-10 are as follows: A wafer 10 is pivoted to the frame body 9 so that it can rotate by the stem 8a. On both sides of said wafer 10 are provided a conductive part 10a and a nonconductive part 10b which are circumferentially equi-divided in as many as channel numbers so that the digital coded signals can be generated. Said both sides of the wafer 10 are provided with as many terminals 11 as are necessary to make selective contact with said conductive part and said nonconductive part. When the stem 8a is rotated, depending on the contact relations between the conductive part 10a, the nonconductive part 10b of the wafer 10 and the terminals 11 the digital coded signal for selecting one of preset frequencies or the digital coded signal for making a digital display of the channel number corresponding to the selected frequency on the display device 4 is generated from the terminals 11 of each switch 8.

On the printed circuit board 12 of the front casing 1a are attached a gain control element 15 (variable resistance) for varying the amplification degree of the audio amplifier 14 and/or the radio frequency amplifier in the transceiver 13 and a squelch control element 16 (variable resistance) for controlling the squelch level of the transceiver 13. The knobs 15a, 16a for the elements 15,16 slightly jut out of the junction between the casings 1a,1b; and the recess 17 surrounding the knobs 15a,16a facilitates the handling of said knobs 15a,16a. The control element 15 is equipped with an on-off switch (power switch) for power supply to the transceiver 13.

Within the front casing 1a there is installed a transmit/receive switch 18 which switches between the transmitting circuit and the receiving circuit and switches the transducer 6 to the speaker use or to the microphone use, while the transmit/receive switch knob 19 is swingably pivoted on the pin 20 and the knob 19 juts out in the opposite direction of the knob 9 from the junction between the casings 1a,1b. With the free end 19a of the knob 19 and the acting piece 18a of the switch 18 elastically brought into contact, the knob 19 is cantilevered so that the switch 18 can act reliably. The transmit/receive switch 18 is a timing switch which works such that in time of transmission the transducer 6 functions as a microphone after the transceiver is switched to the transmitting condition; and in time of reception the transceiver 13 is switched to the receiving condition after the transducer 6 ceases to function as a microphone.

The backside of the rear casing 1b is partially raised to form a flat projection 21, upon which a metal hook 22 with a head 22a is erected, so that the backside of the housing 1 may not be damaged when the housing 1 is hung onto the transceiver by means of said metal hook 22 and at the same time the housing 1 may be easy to hang.

Within the front casing 1a is installed a PA/CB switch 23 which switches the transceiver 13 itself between use as an amplifier and use as a transceiver. The acting piece 23a of said switch 23 comes outside through the rear casing 1b. When the piece 23a is set at CB-mark position, the device functions as a transceiver; and when it is set at PA-mark position, the device functions as a public address amplifier.

Before the front casing 1a come a transmit/receive level display element 24a consisting of LED and an "on air" display element 24b to assure the reliability of transmission and reception. Said transmit/receive level display element 24a may consist of a moving coil type meter 24a as indicated by a one dot-chain line of FIG. 1, instead of LED. In the electric circuit between the display device 4 and the rotary switch 8 is provided a resistance 25 as voltage control means, said resistance serving to optimize the brightness of the display on the display device 4 through voltage control. The resistance 25 is attached to the printed circuit board 3.

The electrical parts within the housing 1 and the transceiver 13 are electrically connected over a cord 26. A pipe 28 of rubber or other soft material runs through the hole 27 of the housing and said cord 26 extended through this pipe 28 can be protected at its lead-out part. The electrical parts built into the housing 1 are electrically connected there to the printed circuit board.

FIG. 11 is a block diagram of the electric circuit. Now the control element 15 is worked to supply power and put the transceiver 13 in working condition. In this condition the transmit/receive switch knob 19 is jutting out of the housing 1 with the receiving circuit of the transceiver ready to work and the transducer 6 ready to function as a speaker. When the knob 9 of the rotary switch 8 turns, the digital coded signal changes, causing the display device 4 and a programmable divider of the PLL frequency synthesizer (Phase Locked Loop) 29 to act, whereby the display device 4 rotates the knob 9 and the channel number thus selected is digitally displayed, while the PLL frequency synthesizer 29 functions as a local oscillator. Since the antenna switching circuit 30 is switched to receiving condition, the input radiowave from the antenna 31 is amplified by the radio frequency amplifier; the output thereof and the local oscillator output from said PLL frequency synthesizer 29 go into the mixer to be converted to an intermediate frequency, which is then amplified by the intermediate frequency amplifier and then sensed by a detector, thereby yielding an audio frequency. This audio frequency is amplified by the audio amplifier 14 and it causes the action of the transducer 6 in the housing 1 which functions as a speaker. The modulator 14 functions in time of receiving condition as an audio amplifier 14.

When the transmit/receive switch knob 19 is pressed into the housing 1, the contact in the switch 18 breaks to make the transmitting circuit of the transceiver 13 ready for work and at the same time cause the transducer 6 to function as a microphone, thereby bringing about the transmitting condition. Thus transmitting frequency is a frequency selected by a digital coded signal generated by the rotary switch 8; it is modulated by an audio signal from the transducer 6 and, after power-amplified by the transmitting part, it is transmitted from the antenna 31.

When the PA/CB switch 23 is set at PA-mark position, the transducer 6 functions as a microphone; the audio signal from the transducer 6 is amplified by the modulator which functions also as an audio amplifier and it causes the action of a speaker 32 for exclusive use of PA, thereby the voice of an operator sitting in the vehicle being heard aloud outside of the vehicle.

The transducer 6 which has to function both as a speaker and as a microphone has its microphone characteristic declined. For this reason, a frequency characteristic compensation circuit is added.

Figure 12:
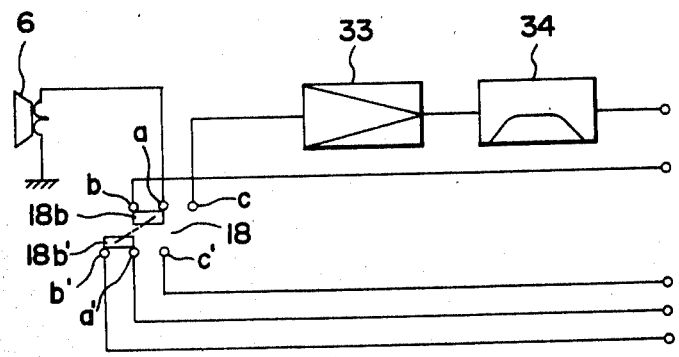
FIG. 12 is a block diagram of the characteristic compensation circuit of the transducer.

In FIG. 12, 6 denotes the transducer which serves both as a microphone and as a speaker, one terminal of said transducer being earthed and the other terminal of it being connected to an central contact a for switching the transducer 6 between use as a microphone and use as a speaker. The contact b at the left end is connected to the output end of the modulator 14, while the contact c at the right end is connected to the amplifier circuit 33 and to the electrical filter 34, the output end of the filter 34 being connected to the input end of the modulator 14.

The other contacts a', b', c' of the switch 18 are so connected that switching can be made between the transmitting circuit and the receiving circuit. The sliding pieces 18b,18b' are moved together by the acting piece 18a to switch the contacts a, b, c; a', b', c'. The filter 34 employed for this purpose has such a performance that it is capable of compensating the frequency characteristic when the transducer 6 is used as a microphone and it permits passage through only a high-articulation band.

Figure 13:
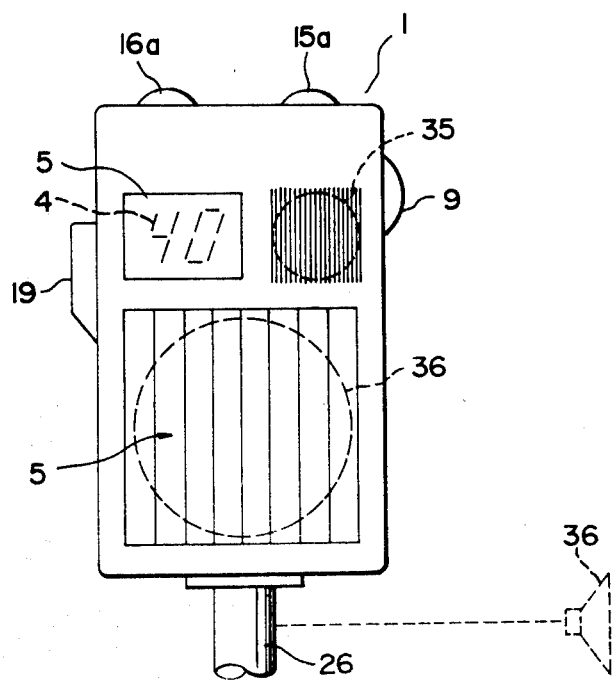
FIG. 13 is an elevation view of a hand-held microphone as another embodiment of the present invention.

FIG. 13 illustrates another embodiment of the present invention, in which the speaker and the microphone are designed as separate units.

Referring to the drawings, 1 is the housing into which are built the microphone unit 35 and the speaker 36 at relative positions described later. A cord 26 coming out from under the housing 1 is connected to the transceiver 13.

The speaker extends from nearly the midpoint of the housing 1 to one end of it (bottom in the drawing); while the microphone unit 35 extends from nearly the midpoint of the housing, close to the speaker 36, to the other end of it (top in the drawing), at a position to the right side of the midpoint of the housing 1.

Such a positioning of the microphone unit 35 leaves a gap within the housing 1 and into this gap is built the channel number display device. Under such a positioning of the microphone unit many functional components needed for operation can be held within the casings, thereby enhancing the operating efficiency. In this case, the frequency characteristic compensation circuit is not generally provided.

In FIG. 13, if necessary, only the microphone unit 35 may be held within the housing 1, while the speaker 36 may be separated from the housing 1 and placed appropriately in the transceiver case 13 or in the vehicle; in that case the speaker of a radio set may be used as the speaker 36.

According to the present invention in which the transceiver operating portions are provided at the microphone, the operator can freely handle the transceiver with the microphone held in one hand. Since the frequency selection is made by means of a digital coded signal, a bulky microphone as conventionally employed is needless and a few conductors suffice for the cord to connect the microphone with the transceiver.

What is claimed is:

1. A hand-held microphone unit for controlling a transceiver over a multi-conductor cable electrically connected therebetween, the microphone unit comprising:

a housing small enough to grip by one hand;
a rotary switch means installed in said housing yet operable from outside the housing, the switch means comprising a pair of rotary switches, a first of the pair of rotary switches generating a first digital coded signal for selecting one of a set of preset frequencies within the transceiver, a second of the pair of rotary switches generating a second digital coded signal for making a digital display of the channel number corresponding to the selected frequency;
a channel number display means installed in said housing, with the display surface exposed outside, being driven by the second digital coded signal from the second of the pair of rotary switches for displaying the channel number corresponding to the selected frequency;
an electroacoustic transducer means installed in said housing for converting any impressed pattern of sound into a corresponding electrical signal;
a transmit/receive switch means installed in said housing for switching between the transmitting condition and the receiving condition and at the same time actuating said electroacoustic transducer means; and
a gain control means installed in said housing for varying the amplification degree of at least one amplifier in the transceiver.

2. Hand-held microphone of claim 1 further comprising a squelch control means for adjusting the squelch level of the transceiver, said squelch control means together with the gain control means being installed partially projecting out of the housing at a convenient position for operation.

3. Hand-held microphone of claim 1, wherein the operating knob of the rotary switch means and the knob of the transmit/receive switch means are partly projecting out of the housing so that they can be easily operated, the respective projecting directions of said knobs being opposite to each other relative to the housing.

4. Hand-held microphone of claim 1, wherein between the second rotary switch and the channel number display means there is connected a voltage control means to adjust the brightness of display.

5. Hand-held microphone of claim 1, wherein the transmit/receive switch means comprises a switch each contact of which is staggered with respect to a mating contact such that the electroacoustic transducer means functions as a microphone after the transceiver is brought to transmitting condition and the transceiver returns to receiving condition after the electroacoustic transducer means ceases to function as a microphone.

6. Hand-held microphone of claim 1, wherein the electroacoustic transducer means functions both as a microphone and as a speaker.

7. Hand-held microphone of claim 1, wherein the electroacoustic transducer means consists of separate units of a microphone and a speaker and is installed in the housing.

8. Hand-held microphone of claim 1, wherein the electroacoustic transducer means consists of a microphone unit and a speaker in separate units, the microphone unit being installed in the housing and the speaker being set separate from the housing.

9. Hand-held microphone of claim 1, wherein the housing is equipped with a transmit/receive level display means for assuring the transmitting or receiving condition of the transceiver.

10. Hand-held microphone of claim 9, wherein the transmit/receive level display means consists of LED.

11. Hand-held microphone of claim 9, wherein the transmit/receive level display means is a moving coil type meter.

12. A transceiver comprising:

a transceiver case;

a receiving circuit installed within the transceiver case for receiving one of a plurality of preset radio frequency signals when the transceiver is in receiving condition and converting the received radio frequency signal into an electrical output of acoustic frequency;

a transmitting circuit installed within the transceiver case for converting an electrical signal of acoustic frequency input into a radio signal to be transmitted at a selected preset frequency;

a PLL frequency synthesizer installed within the transceiver case and operated by a digital coded signal so as to synthesize the select preset frequency and serve as local oscillator when the transceiver is in receiving condition;

a separate housing easily held by one hand connected to the transceiver case and components therein by a multiconducter cable;

a frequency selecting means installed within the housing for generating a digital coded signal which individually selects preset frequencies, the frequency selecting means comprising conductive and nonconductive parts which selectively contact with terminals for generating the digital coded signals;

a channel number display means installed within the housing with its display surface exposed outside of the housing, the display means controlled by the frequency selecting means for displaying the channel selected by the frequency selecting means;

an electroacoustic means installed in the housing for converting any impressed pattern of sound into a corresponding electrical signal;

a transmit/receiving switch means installed in the housing for switching the transceiver between transmitting condition and receiving condition and for actuating the electroacoustic means; and a gain control means installed in the housing for varying the amplification of at least one amplifier within the receiving circuit of the transceiver.

13. A control unit for a transceiver comprising:

a housing as small as to be held by one hand, the housing being electrically connected with the transceiver over a multi-conductor cable so that the transceiver may be remote-controlled;

a frequency selecting means installed within the housing for generating a digital coded signal which individually selects preset frequencies, the frequency selecting means comprising conductive and non-conductive parts which selectively contact with terminals for generating the digital coded signals and controlling a channel number display means;

a channel number display means installed within the housing with its surface exposed outside of the housing and controlled by the frequency selecting means for displaying the channel corresponding to the frequency selected by the frequency selecting means;

an electroacoustic means which is installed within the housing for converting any impressed pattern of sound into a corresponding electrical signal;

a transmit/receiving switch means which is installed within the housing for switching the transceiver between transmitting condition and receiving condition and for actuating the electroacoustic means; and a gain control means which is installed within the housing for varying amplification degree of at least one amplifier within the transceiver.

* * * * *